US005772939A

United States Patent [19]

Palm et al.

[11] Patent Number: 5,772,939

[45] Date of Patent: Jun. 30, 1998

[54] MANUFACTURE OF BUILDING PRODUCTS

[75] Inventors: Jeffery James Palm, Gilroy; Luis Garcia, Jr., Hollister; James Gilbert Buchanan, Lodi, all of Calif.; Bhushan Kumar Oberoi, Reigate, United Kingdom

[73] Assignee: Monier, Inc., Winters, Calif.

[21] Appl. No.: 675,088

[22] Filed: Jul. 3, 1996

[30] Foreign Application Priority Data

Jul. 5, 1995 [GB] United Kingdom .................... 9513692

[51] Int. Cl.[6] ............................ B28B 11/16; B29C 37/00

[52] U.S. Cl. ............................................ 264/145; 264/160

[58] Field of Search .................................... 264/138, 145, 264/160

[56] References Cited

U.S. PATENT DOCUMENTS

| | | | |
|---|---|---|---|
| 1,952,828 | 3/1934 | Volkhardt | 264/160 |
| 1,972,312 | 9/1934 | Pemberton et al. | 264/160 |
| 2,314,529 | 3/1943 | Thurston | 264/160 |
| 4,666,648 | 5/1987 | Brittain | 264/145 |
| 5,017,320 | 5/1991 | Velazquez Garcia | 264/160 |
| 5,223,200 | 6/1993 | Schulz et al. | 264/160 |

*Primary Examiner*—Christopher A. Fiorilla
*Attorney, Agent, or Firm*—Rothwell, Figg, Ernst & Kurz, P.C.

[57] ABSTRACT

A method of manufacturing concrete roof tiles having the appearance of shake by providing the leading edges of successive tiles with a randomly shaped leading edge. The method comprises forming a ribbon of mortar on a series of tile forming pallets; and effecting rupture of the ribbon at joints between successive pallets by causing a leading pallet to accelerate away from the remaining pallets to create a gap therebetween.

3 Claims, 4 Drawing Sheets

MANUFACTURE OF BUILDING PRODUCTS

TITLE OF THE INVENTION

This invention is concerned with improvements in or relating to building products and is particularly, although not exclusively, concerned with the manufacture of concrete roof tiles.

BACKGROUND OF THE INVENTION

Concrete roof tiles are in the main formed by the well known roller and slipper process in which tile pallets are fed seriatim beneath the mortar hopper of a tile making machine, whereat when the machine is in use, mortar is fed onto the pallets to form a continuous ribbon thereon. Downstream of the mortar hopper, a cutting mechanism of the tile making machine is operated to cut the ribbon of mortar to form discrete "green state" tiles on the individual pallets which "green state" tiles are thereafter cured by conventional means.

The upper surfaces of the tiles so formed are generated by the roller and slipper and may therefore be of any desired profile across the width of the tiles so formed. For example, the tiles may have a simulated "shake" appearance, i.e. the look of wooden shakes or shingles which are used predominantly in the United States of America.

The under-surfaces of the tiles, on the other hand, are formed by the pallets, that is, the surfaces of the pallets are shaped with recesses and channels to form hanging nibs, strengthening ribs and downwardly facing interlocking side-lock features of the tiles.

Conversely, in other tile manufacturing processes presently used, the tiles may be made upside down with, e.g. upper textured surfaces of the tiles being formed by appropriately shaped pallets and the under surfaces thereof being formed by the roller and slipper.

In the manufacture of tiles with a simulated "shake" appearance, it is conventional in the tile manufacturing process to shape the leading edges of successive tiles to give them the uneven appearance of a natural "shake" formed from cedar wood or the like.

This shaping of the leading edges of successive tiles may be effected using a shaped knife as disclosed in U.S. Pat. No. 4,666,648 (David R. Brittan), see FIGS. 1 and 3 thereof.

Provision of an uneven leading edge to a succession of roof tiles, using the shaped knife of U.S. Pat. No. 4,666,648 may be acceptable; however, to the discerning eye it is obvious that each tile on a roof of such tiles has the same pattern of cut, which detracts from the aesthetic quality of the roof.

SUMMARY OF THE INVENTION

It is one of the objects of the present invention to provide an improved method of manufacturing concrete roof tiles having the appearance of a shake wherein the leading edges of successive tiles are provided with a randomly shaped leading edge thereto.

The present invention thus provides a process for the manufacture of roof tiles having randomly shaped leading edges, i.e. the edges of the tiles that are lowermost in use on a roof, said process including the steps of:

a) forming a ribbon of "green state" mortar on a series of tile forming pallets; and, b) effecting the rupture of said ribbon of "green state" mortar at joints between successive pallets of said series to provide the randomly shaped leading edges, characterised in that the rupture of the ribbon of "green state" mortar at the joints between the successive pallets of the series is effected by causing successive leading ones of the series of pallets to be accelerated away from the remaining pallets of the series to create a gap therebetween whereby the ribbon of "green state" mortar is broken coincident with said gap, or substantially so, to produce a randomly shaped leading edge to the tiles formed on successive pallets of the series.

Conveniently, the present invention also provides a process for the manufacture of roof tiles having randomly shaped leading edges, i.e. the edges of the tiles that are lowermost in use on a roof, said process comprising the steps of:

a) feeding a series of pallets seriatim beneath a hopper containing tile mortar;

b) causing the tile mortar to be fed from the hopper onto the series of pallets to form a continuous ribbon of mortar thereon; and, c) causing a first pallet downstream of the hopper to be accelerated away from a second pallet of the series of pallets to create a gap between said first and second pallets and thereby effecting the rupture of the ribbon of mortar at the joint between said first and second pallets to provide a randomly shaped leading edge to the ribbon of mortar on said second pallet.

Preferably, the present invention provides a process for the manufacture of roof tiles having randomly shaped leading edges, i.e. the edges of the tiles that are lowermost in use on a roof, said process comprising the steps of:

a) feeding a series of pallets seriatim beneath a hopper containing tile mortar;

b) causing the tile mortar to be fed from the hopper onto the series of pallets to form a continuous ribbon of mortar thereon;

c) causing a first pallet downstream of the hopper to be accelerated away from a second pallet of the series of pallets to create a gap between said first and second pallets and thereby effecting the rupture of the ribbon of mortar at the joint between said first and second pallets to provide a randomly shaped leading edge to the ribbon of mortar on said second pallet;

d) decelerating said first pallet thereby closing the gap between the first and second pallets and the gap between the ruptured ribbon of mortar;

e) causing operation of a knife to cut a trailing edge of the tile mortar on the first pallet downstream of said rupture;

f) accelerating said first pallet away from said second pallet thereby causing mortar cut from said trailing edge of the ribbon of mortar on said first pallet to be detached therefrom; and, g) repeating the process by effecting the stages a) to f) as between said second pallet and a third pallet in said series of pallets and so on.

The present invention also provides a roof tile made according to the process of any one of the last three preceding paragraphs.

BRIEF DESCRIPTION OF THE DRAWINGS

There now follows by way of example of the present invention a detailed description of the novel process for the production of roof tiles, which description is to be read with reference to the accompanying drawings in which.

DETAILED DESCRIPTION OF THE INVENTION

In the manufacture of concrete roof tiles by conventional tile processing methods, it is usual to provide tiles, which are shaped to simulate cedar "shakes" or the like, with irregular cut front edges, i.e. the edge of the tile that is lowermost on a roof in use is formed using a shaped knife similar to that disclosed in U.S. Pat. No. 4,666,684.

Figure 1:
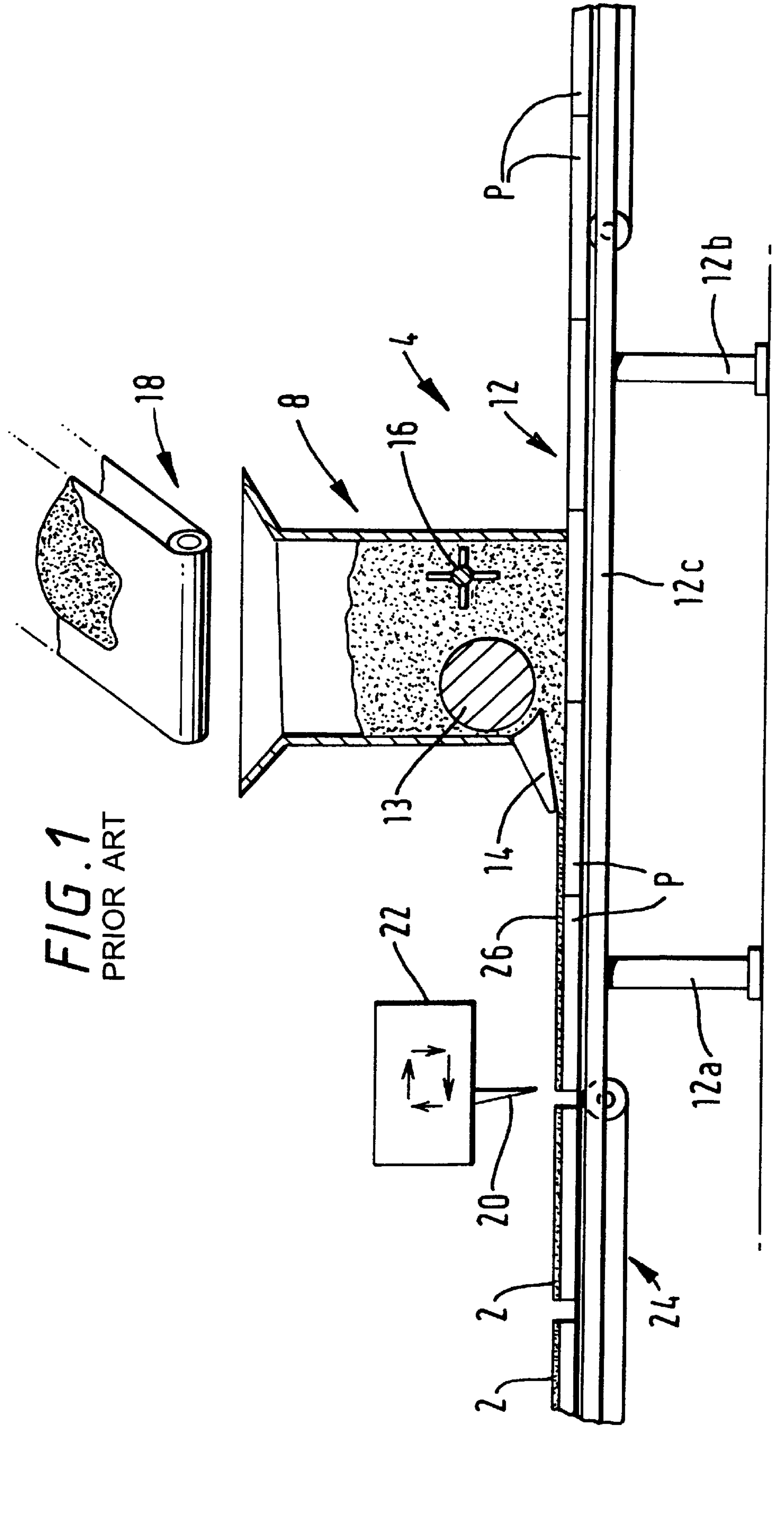
FIG. 1 PRIOR ART
FIG. 1 is a diagrammatic side elevation of a conventional tile making machine.

Such tiles 2 may be produced on a conventional tile machine 4 shown in FIG. 1, which tile machine 4 comprises a hopper 8 located overlying a pallet conveyor 12. The conveyor 12 is of conventional design, is supported on floor mounted columns 12$a$ and 12$b$ and comprises support rails 12$c$ on which pallets P are supported as they pass seriatim beneath the hopper 8.

The hopper 8 is also of conventional design and provides support for a roller 13, a slipper 14 and a pack shaft 16.

Located above the hopper 8 is a material feed conveyor 18 for feeding mortar to the hopper, see FIG. 1.

Downstream of the hopper 8, the tile making machine is provided with a conventional tile cutting knife 20 which is mounted for reciprocal vertical and longitudinal movement on a knife carriage 22 illustrated schematically in FIG. 1.

The tile making machine also comprises a pallet spacing conveyor 24 which is arranged beneath the conveyor 12 and adjacent the knife carriage 22 for accelerating pallets P at the head of a series of such pallets away from the remaining pallets of the series.

When the machine of FIG. 1 is in use in the manufacture of concrete roofing tiles, a batch of mortar is fed by the conveyor 18 to the hopper 8. At the same time, pallets P are fed seriatim along the support rails 12$c$ of the conveyor 12 so that mortar in hopper 8 is compacted by the packshaft 16, to be thereafter formed, by the roller 13 and slipper 14, as a continuous ribbon 26 of "green state" mortar on the pallets P.

The ribbons 26 of "green state" mortar is thereafter cut by the knife 20 of the tile cutting arrangement 22 whereafter the pallets P are engaged by the conveyor 24 whereby the "green state" tiles 2 on their associated pallets P are conveyed to racking devices prior to transportation to curing chambers.

It is obvious that the leading edge of a tile 42 produced in this manner will be identical with the leading edges of all of the tiles since the knife 20 is utilized to sequentially sever all of the tiles 2 on their respective pallets P.

Figure 2:
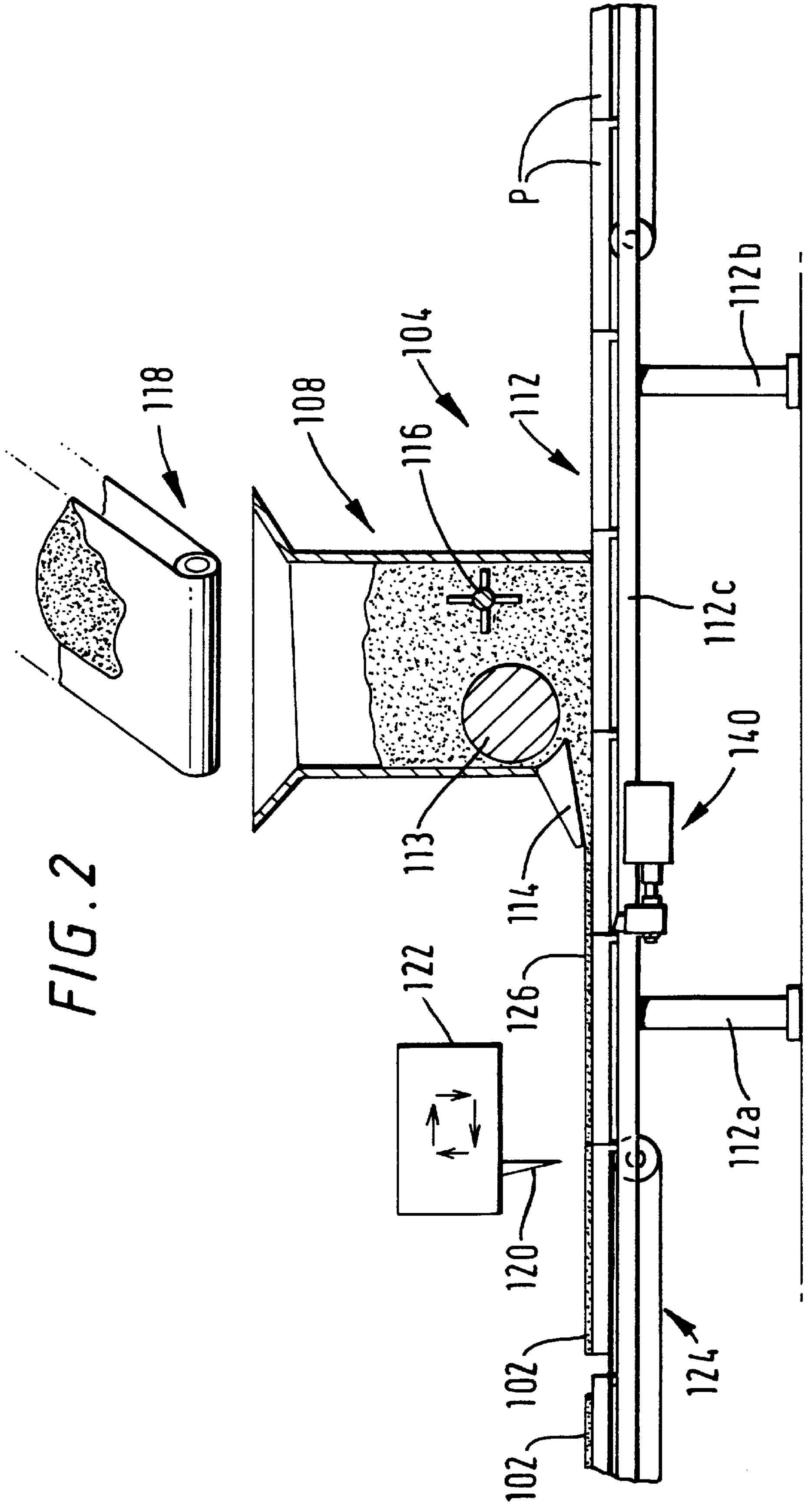
FIG. 2 is a view corresponding to FIG. 1 illustrating a modified machine for effecting the novel tile making process.
Figure 3:
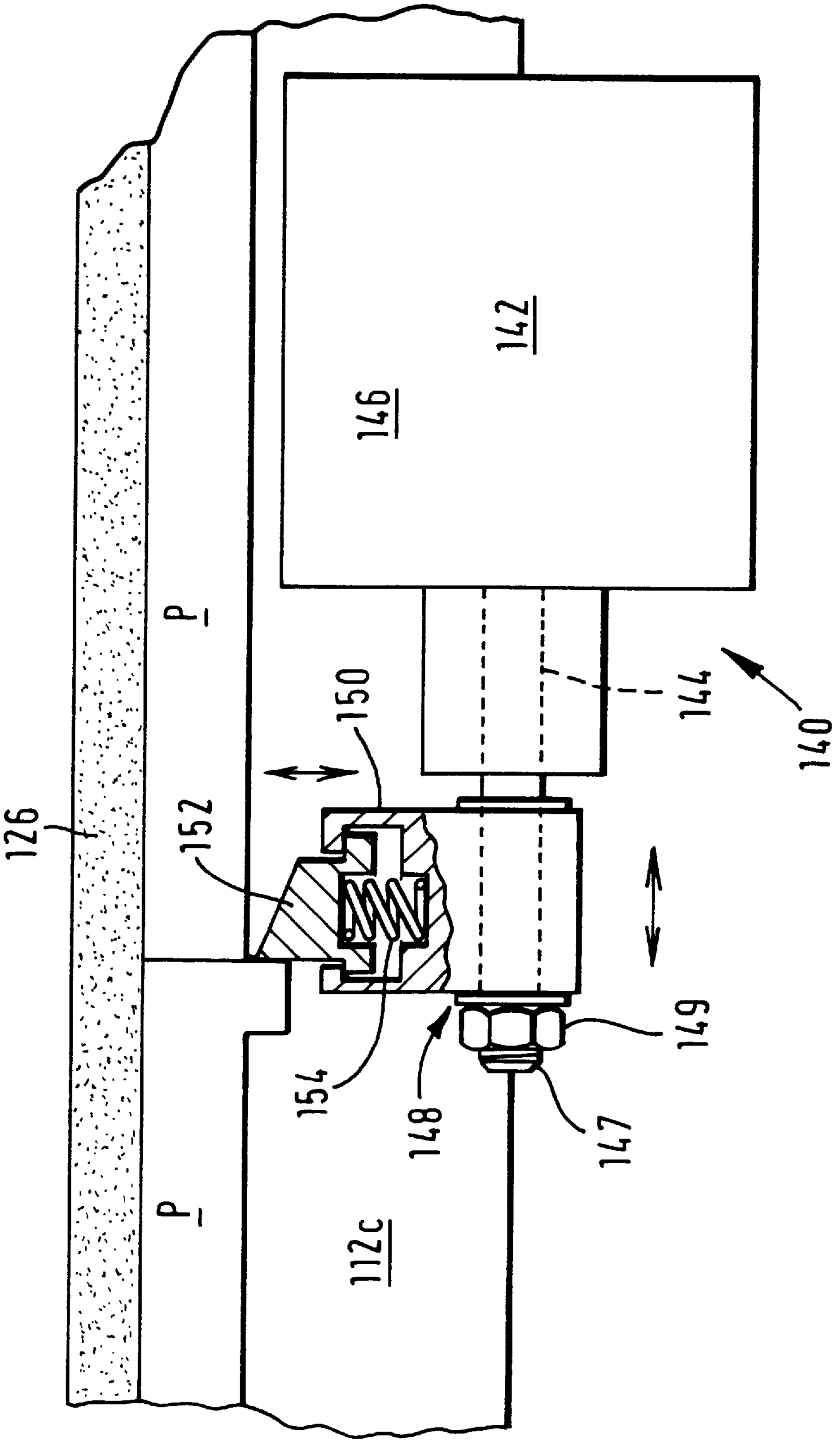
FIG. 3 is an enlarged view of the modification illustrated in FIG. 2; and, FIGS. 4$a$ to 4$f$ are schematic representations in side elevation illustrating the operative sequence of the novel process when effected on a modified tile making machine for the production of roof files.

A modified tile machine 104 is provided by the present invention for facilitating the novel process of manufacturing roof tiles 102, see FIGS. 2 and 3.

The tile machine 104 is essentially of the same design as the tile machine 4 of FIG. 1 and comprises a hopper 108 located overlying a pallet conveyor 112.

The conveyor is of conventional design, is supported on floor mounted columns 112$a$ and 112$b$ and comprises support rails 112$c$ on which pallets P are supported as they pass seriatim beneath the hopper 108.

The hopper 108 is also of conventional design and provides support for a roller 113, a slipper 114, and a packshaft 116.

Located above the hopper 108 is a material feed conveyor 118 for feeding mortar to the hopper 108, see FIG. 2.

Downstream of the hopper 108, the tile making machine 104 is also provided with a conventional tile cutting knife 120 which is mounted for reciprocal vertical and longitudinal movement on a knife carriage 122 illustrated schematically in FIG. 2.

The tile making machine 104 also comprises a pallet spacing conveyor 124 which is arranged beneath the conveyor 112 and adjacent the knife carriage 122 for accelerating pallets P at the head of a series of such pallets away from the remaining pallets of the series, see FIG. 2.

The modified tile machine 104 also comprises a pallet accelerator device 140 located under the conveyor 112 and supported between the rails 112$c$ thereof.

The device 140 is arranged downstream of the slipper 114 but upstream of the knife carriage 122, see FIG. 2.

The device 140, see especially FIG. 3, comprises a piston and cylinder arrangement 142 a piston rod 144 of which extends leftwardly of the cylinder 146, see FIG. 3.

Fixedly mounted on an end 147 of the piston rod 144, and secured thereto by an hexagonal nut 149, is a drive element 148.

The drive element 148 provides a housing 150 for a captively mounted drive dog 152, see FIG. 3, the operation of which will be made clear hereinafter.

The drive dog 152 is located in said housing 150 for movement between an operative position as shown in FIG. 3 and an inoperative position in which a spring 154 located in said housing is compressed by downward movement of the drive dog effected by the passage of pallets P thereover during the operation of the tile machine.

The novel process provided by the present invention will now be described with particular reference to FIGS. 4$a$ to 4$f$ in which arrow "A" indicates the general direction of movement of the pallets P. In FIG. 4$a$ a ribbon of mortar 126 formed on the pallets P overlies pallets P3 and P4, pallets P1 and P2 having moved downstream in prior sequences of the process.

As the pallet P3 reaches the position shown in FIG. 4$b$, the device 140 is actuated to cause the drive dog 152 thereof to engage a trailing end portion of the pallet P3.

Upon engagement of the drive dog 152 with the pallet P3, the pallet P3 is accelerated away from the next in line pallet P4 thereby causing the ribbon of mortar 126 to rupture at the joint line between said pallets to provide the randomly shaped leading edge to a tile 102$c$ as shown in FIG. 4$c$.

The device 140 is retracted to move the drive dog 152 away from the pallet P3 whereupon the pallet P3 decelerates to enable the series of pallets P, led by the pallet P4, to move into shunt relationship with the pallet P3, see FIG. 4$d$.

As the pallets P with their "green state" tiles and the continuous ribbon of mortar 126 formed thereon move downstream, i.e. in the direction of the arrow "A", see FIG. 4$e$, the knife 120 is operated to cut a trailing edge portion of the "green state" tile 102$b$. It will be appreciated that at this time, since the pallets P2, P3, P4, etc. are in shunt relationship the knife 120 effects a true and clean cut on the trailing edge portion of the tile 102$b$ to delineate a band W of waste extending across the pallet P2 and adjacent the pre-formed leading edge of the "green state" tile 102*c*.

Figure 4A:
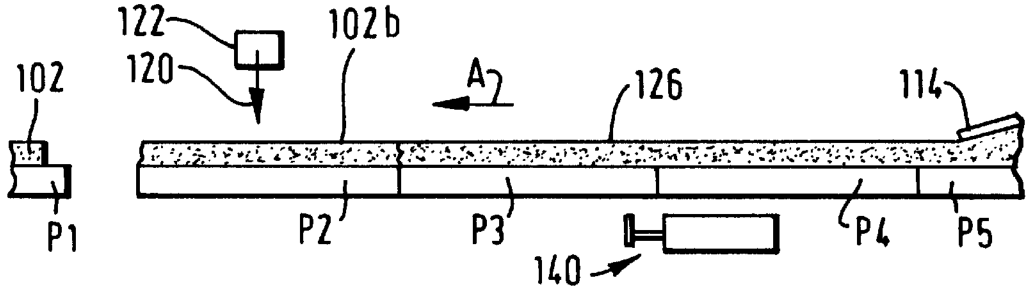
Figure 4B:
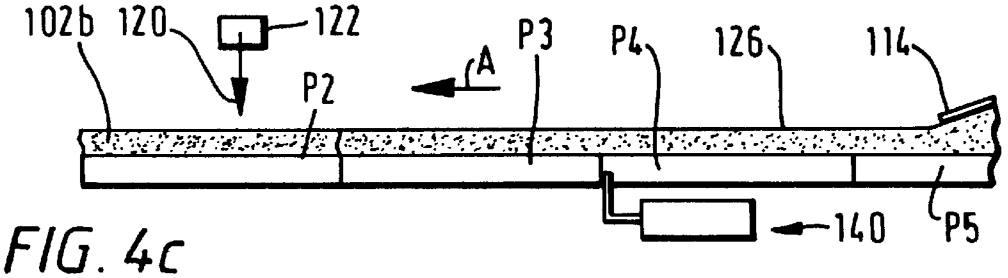
Figure 4C:
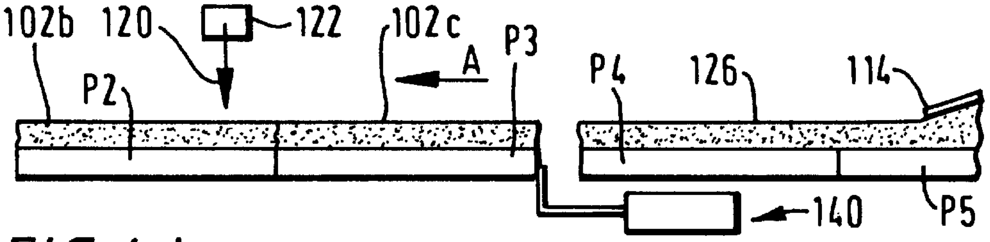
Figure 4D:
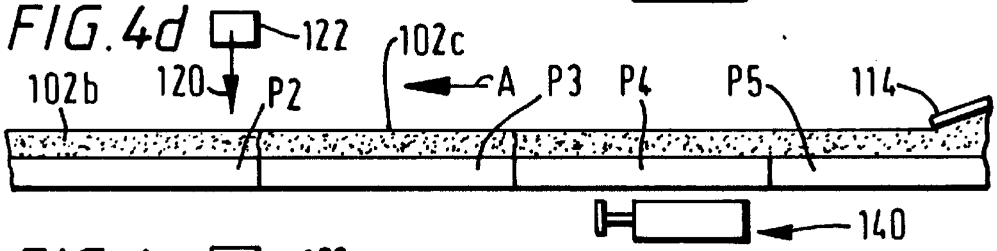
Figure 4E:
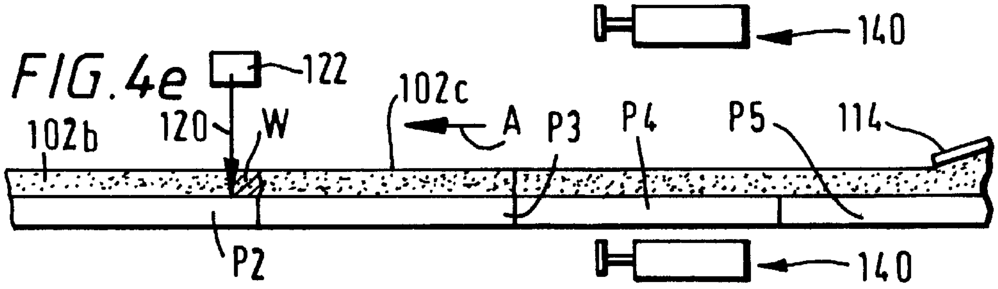
Figure 4F:
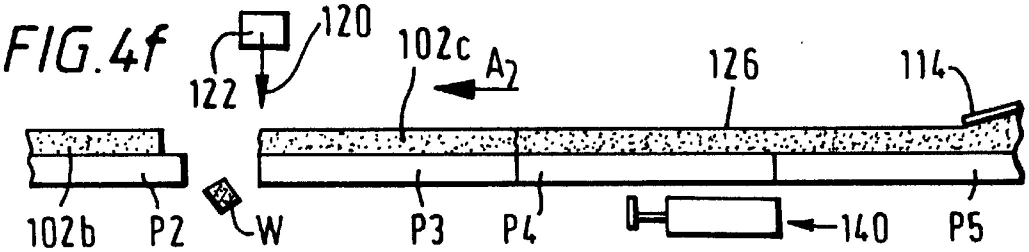

When the knife 120 is retracted after effecting its cutting operation as aforesaid, the pallet P2 passes onto the conveyor 124 to be accelerated away from the remaining pallets of the series, see FIG. 4f, whereat the band W of waste mortar falls away from the pallet P2.

When the pallets P4, P5, etc., reach the positions coincident with those of pallets P3, P4 in FIG. 4*a* the sequence is repeated.

It will be appreciated that "shake" type tiles provided with a randomly shaped leading edge by the novel process disclosed herein will have an enhanced aesthetic appeal over tiles where any randomicity is prejudiced by the repetitive use of the same cutting or forming tool on the leading edges of "green state" roof tiles.

It will also be apparent that the device 140 may be replaced by any convenient pallet acceleration means.

We claim:

1. A process for the manufacture of roof tiles having randomly shaped leading edges, i.e. the edges of the tiles that are lowermost in use on a roof, said process including the steps of:

a) forming a ribbon of "green state" mortar on a series of tile forming pallets; and, b) effecting the rupture of said ribbon of "green state" mortar at joints between successive pallets of said series to provide the randomly shaped leading edges, characterised in that the rupture of the ribbon of "green state" mortar at the joints between the successive pallets of the series is effected by causing successive leading ones of the series of pallets to be accelerated away from the remaining pallets of the series to create a gap therebetween whereby the ribbon of "green state" mortar is broken coincident with said gap, or substantially so, to produce a randomly shaped leading edge to the tiles formed on successive pallets of the series.

2. A process for the manufacture of roof tiles having a randomly shaped leading edges, i.e. the edges of the tiles that are lowermost in use on a roof, said process comprising the steps of:

a) feeding a series of pallets seriatim beneath a hopper containing tile mortar;

b) causing the tile mortar to be fed from the hopper onto the series of pallets to form a continuous ribbon of mortar thereon; and, c) causing a first pallet downstream of the hopper to be accelerated away from a second pallet of the series of pallets to create a gap between said first and second pallets and thereby effecting the rupture of the ribbon of mortar at the joint between said first and second pallets to provide a randomly shaped leading edge to the ribbon of mortar on said second pallet.

3. A process for the manufacture of roof tiles having randomly shaped leading edges, i.e. the edges of the tiles that are lowermost in use on a roof, said process comprising the steps of:

a) feeding a series of pallets seriatim beneath a hopper containing tile mortar;

b) causing the tile mortar to be fed from the hopper onto the series of pallets to form a continuous ribbon of mortar thereon;

c) causing a first pallet downstream of the hopper to be accelerated away from a second pallet of the series of pallets to create a gap between said first and second pallets and thereby effecting the rupture of the ribbon of mortar at the joint between said first and second pallets to provide a randomly shaped leading edge to the ribbon of mortar on said second pallet;

d) decelerating said first pallet thereby closing the gap between the first and second pallets and the gap between the ruptured ribbon of mortar;

e) causing operation of a knife to cut a trailing edge of the tile mortar on the first pallet downstream of said rupture;

f) accelerating said first pallet away from said second pallet thereby causing mortar cut from said trailing edge of the ribbon of mortar on said first pallet to be detached therefrom; and, g) repeating the process by effecting the stages a) to f) as between said second pallet and a third pallet in said series of pallets and so on.

* * * * *

UNITED STATES PATENT AND TRADEMARK OFFICE

CERTIFICATE OF CORRECTION

PATENT NO. : 5,772,939

DATED : 30 June 1998

INVENTOR(S) : Jeffery J. PALM et al.

It is certified that error appears in the above-identified patent and that said Letters Patent is hereby corrected as shown below:

Column 3, line 11, “files” should be -- tiles --.

Column 3, line 50, “ribbons” should be -- ribbon --.

Signed and Sealed this

Twenty-eighth Day of November, 2000

Attest:

Q. TODD DICKINSON

Attesting Officer

*Director of Patents and Trademarks*